US008014012B2

(12) United States Patent
Rodriguez et al.

(10) Patent No.: US 8,014,012 B2
(45) Date of Patent: Sep. 6, 2011

(54) SOFTWARE UPGRADES FROM A PRINTER MODULE WITH ON-BOARD INTELLIGENCE

(75) Inventors: Alberto Rodriguez, Webster, NY (US); Heiko Rommelmann, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 1342 days.

(21) Appl. No.: 10/696,902

(22) Filed: Oct. 30, 2003

(65) Prior Publication Data

US 2005/0094203 A1    May 5, 2005

(51) Int. Cl.
*G06F 15/00* (2006.01)
(52) U.S. Cl. ............ 358/1.15; 358/1.13; 358/1.14; 358/1.16; 399/12; 399/24; 399/25; 399/111; 399/8
(58) Field of Classification Search .......... None
See application file for complete search history.

(56) References Cited

U.S. PATENT DOCUMENTS

| | | | | |
|---|---|---|---|---|
| 5,835,817 A * | 11/1998 | Bullock et al. | ............. | 399/25 |
| 5,930,553 A * | 7/1999 | Hirst et al. | ............. | 399/8 |
| 6,459,860 B1 * | 10/2002 | Childers | ............. | 399/12 |
| 6,532,351 B2 * | 3/2003 | Richards et al. | ............. | 399/111 |
| 7,043,166 B2 * | 5/2006 | Parry et al. | ............. | 399/12 |
| 7,146,412 B2 * | 12/2006 | Turnbull | ............. | 709/220 |
| 7,262,873 B1 * | 8/2007 | Rasche et al. | ............. | 358/1.15 |
| 7,268,900 B1 * | 9/2007 | Zimmerman | ............. | 358/1.15 |
| 7,301,655 B1 * | 11/2007 | Zimmerman et al. | ............. | 358/1.15 |
| 2002/0140966 A1 * | 10/2002 | Meade et al. | ............. | 358/1.15 |
| 2002/0143924 A1 * | 10/2002 | Iga | ............. | 709/223 |
| 2002/0164168 A1 * | 11/2002 | Hayakawa | ............. | 399/12 |
| 2003/0063305 A1 * | 4/2003 | McIntyre | ............. | 358/1.13 |
| 2004/0045000 A1 * | 3/2004 | Hara | ............. | 717/178 |
| 2004/0080775 A1 * | 4/2004 | Owen et al. | ............. | 358/1.14 |
| 2004/0253011 A1 * | 12/2004 | Rommelmann et al. | ............. | 399/24 |

OTHER PUBLICATIONS

Heiko Rommelmann et al., U.S. Appl. No. 10/458,848 "Printer Module With On-Board Intelligence".

* cited by examiner

*Primary Examiner* — Twyler Haskins
*Assistant Examiner* — Pawandeep Dhingra
(74) *Attorney, Agent, or Firm* — Fay Sharpe LLP

(57) ABSTRACT

An intelligent on-board monitoring system for replaceable module for a printing apparatus includes a memory element, an input for receiving information either from sensors on the replaceable module, or from the printing apparatus concerning printing operations performed, and a microprocessor connected to the memory for performing calculations upon data stored in the memory and upon the input information. By expanding this intelligent on-board monitoring system with expanded memory, either on board the replaceable module, or by way of network access, the capability to enable software upgrades is provided. The software upgrades may relate to the performance of the replaceable module or to the machine into which it is installed. These software upgrades may be accomplished without requiring computational resources of the printing apparatus itself and by proper scheduling without impacting customer machine utilization.

21 Claims, 8 Drawing Sheets

SOFTWARE UPGRADES FROM A PRINTER MODULE WITH ON-BOARD INTELLIGENCE

CROSS-REFERENCE TO RELATED APPLICATIONS

Cross reference is made to the following related application incorporated by reference herein: U.S. patent application Ser. No. 10/458,848 "PRINTER MODULE WITH ON-BOARD INTELLIGENCE" to Heiko Rommelmann, Alberto Rodriguez, Scott J. Bell, and Edwin Kuyt.

BACKGROUND AND SUMMARY

The present invention relates to replaceable modules of a printing apparatus, and particularly to the monitoring of software upgrades and software status of such printing apparatus that employ such replaceable modules as enabled by those replaceable modules.

Many machines have replaceable modules or subassemblies. Printing apparatus, for example, may have one or more replaceable modules, such as a fuser, a print cartridge, a toner cartridge, an electrostatic drum unit, etc. These subassemblies or modules may be individually replaceable by the user, or multiple of the assembly modules may be combined into a single customer replaceable module.

It is known to provide these replaceable modules with memory elements, such as electrically readable chips that, when the module is installed in a machine, enable the machine to read information from the memory and also to write information, such as a print count, to the module memory. The machine reads the information from the module memory element, and performs certain calculations to determine certain performance information, such as whether the replaceable module is due to be replaced. The machine updates the information in the memory element by writing to the memory element so that the machine can continue to monitor the status of the replaceable module.

When a machine with programmable software controls needs to be upgraded it is necessary to send out a field engineer to perform the software upgrade process for machines in the field. This is time consuming and expensive. An additional difficulty is that for some machine products, the inventory of machines in the field and their software level status is inaccurate so that a multiplicity of software revision levels exist. Also, if the software upgrade involve changes that effect the way the machine and the replaceable modules interact then proper coordination is critical to insure that all existing supply of non-compatible replaceable module inventory is exhausted before the software upgrade is performed.

An embodiment disclosed herein is a replaceable module intended for a printing apparatus with programmable software controls. Provided on the replaceable module is an internal memory for holding stored instructions, a peripheral memory holding a software upgrade for the printing apparatus' programmable software controls and a communication interface provided for exchanging information with the printing apparatus. Also provided on the replaceable module is a microprocessor connected to the internal memory, the peripheral memory, and the communications interface, the microprocessor performing the stored instructions to install the software upgrade into the printing apparatus via the communications interface.

Disclosed herein is a method of operating a replaceable module having a processor element. The method comprises placing the printing apparatus into diagnostic mode, allowing a processor element on board the replaceable module to interrogate the printing apparatus, and determining from the interrogation which software components in the printing apparatus need to be upgraded. The method further comprises scheduling, as determined by the processor element, when a software upgrade should occur; followed by accessing memory as directed by the processor element for necessary software code components for an upgrade, and installing the software code into the printing apparatus.

Disclosed herein is, a method of operating a replaceable module having a processor element when placed in a printing apparatus. The method comprises placing the printing apparatus into diagnostic mode, allowing a processor element on board the replaceable module to interrogate the printing apparatus, and determining from the interrogation which software components in the printing apparatus need to be upgraded. The method further comprises, scheduling as determined by the processor element when a software upgrade should occur, accessing memory as directed by the processor element for necessary software code components for an upgrade, and installing the software code into the printing apparatus.

DETAILED DESCRIPTION

While the present invention will herein be described in connection with particular embodiments thereof, the invention is not limited to those particular embodiments. On the contrary, the invention covers all the alternatives, modifications, and equivalence that may be included within the spirit and scope of the invention as defined by the attached claims.

As disclosed herein, a machine with programmable software control may have that software upgraded as performed via microprocessor-enabled, replaceable modules also called customer replaceable units (CRU). One embodiment described further below provides a microprocessor based replaceable module with enough intelligence and memory to support installation of at least some subset of machine software upgrades, as well as still performing its standard replaceable module functions. Provision of a microprocessor core into the replaceable module provides the intelligence to make decisions on needed machine software control upgrades as well as an ability to interface with preexisting machine software. The microprocessor based replaceable module can interrogate the machine into which it is installed to determine if a programmable software control upgrade is necessary and if so, carry out the proper steps to perform the upgrade. Additional peripheral memory may hold the desired programmable software control upgrade code itself, as well as any other control data. Alternatively, if the amount of memory required is too large, the microprocessor based replaceable module could trigger the machine into a diagnostic mode that allows the replaceable module microprocessor to control the software upgrade via a network connection, thus releasing the machine software and machine microprocessor or micro-controller from handling this process directly.

Figure 1:
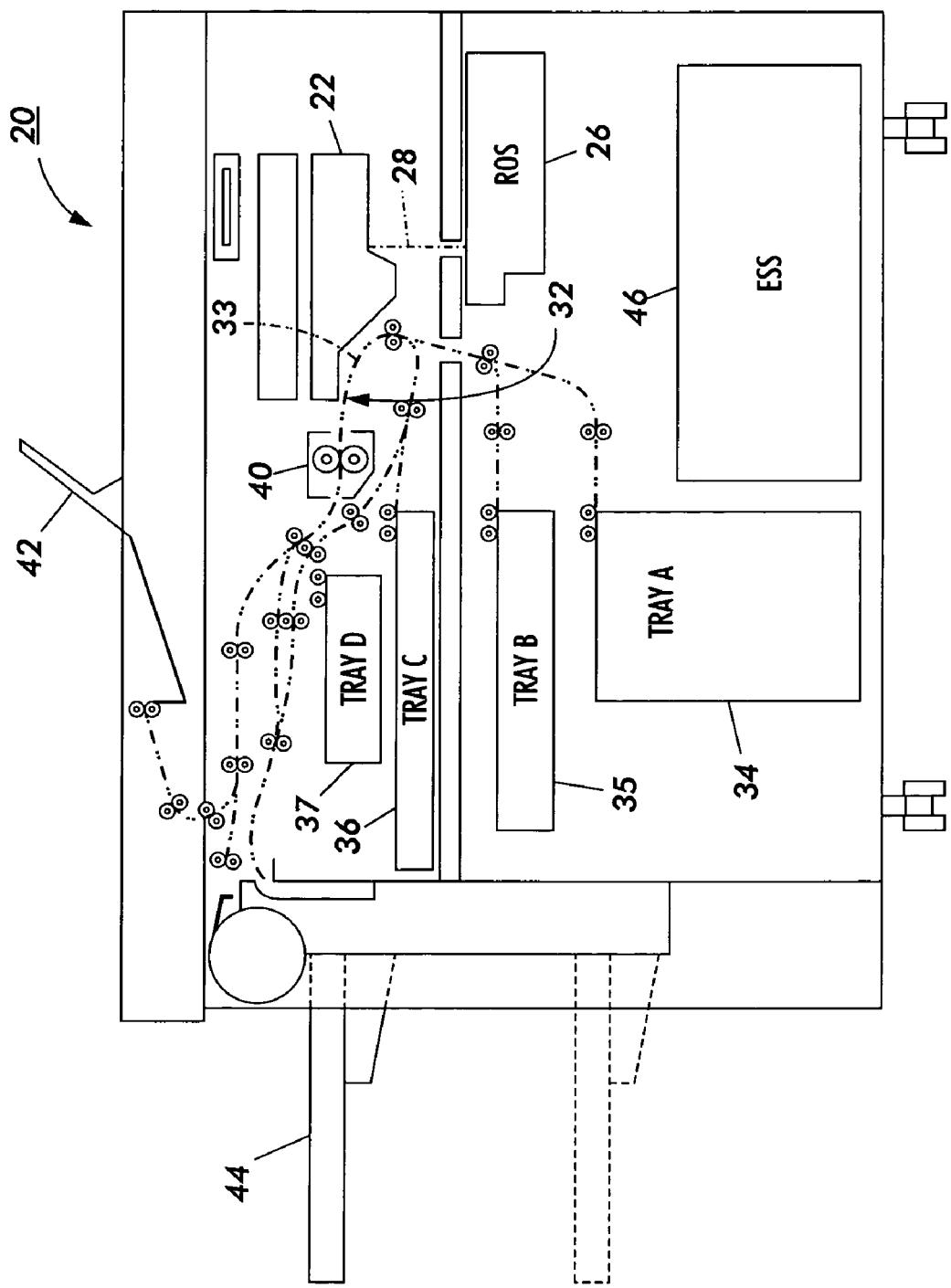
FIG. 1 is a schematic representation of a printing apparatus that can receive a replaceable module.

FIG. 1 schematically shows a printing apparatus, such as an electrostatic or xerographic printer 20, which is commonly called a laser printer. The configuration shown is exemplary only. Persons familiar with printing apparatus will understand that such printers can be implemented in numerous configurations and arrangements. The printing apparatus employs one of more replaceable modules, such as a print cartridge 22. The replaceable print cartridge is shown in greater detail in FIGS. 2 and 3, and comprises several individual printer elements. The print cartridge encloses a xerographic imaging member, such as an endless flexible photoreceptor belt 24, or a photoreceptor drum. In accordance with known xerographic printing techniques, a raster output scanner (ROS) 26 provides an imaging beam 28 that is directed at the photoreceptor belt 24 through an imaging slit 30 in the print cartridge. The imaging beam 28 forms an electrostatic image on the photoreceptor belt 24. The image is developed within the print cartridge, and transferred, at a transfer station 32, to a print medium that passes the transfer station 32 on a media path 33. Referring back to FIG. 1, the printing apparatus delivers the print medium from a media supply tray, which may be one of a plurality of media supply trays 34-37 within or attached to the printing apparatus. The transferred image is fused to the print medium at a fusing station 40. The print medium containing the transferred and fused image is delivered out of the printing apparatus. For example, the print medium containing the image may be delivered to a sample tray 42 that may be on the top of the printing apparatus, or to an output tray such as a stacking tray 44 on the side of the printing apparatus. Persons skilled in the art will recognize that an alternative is that the print medium with the fused image on one side may be put into a trayless duplex path (not shown) within the printing apparatus, to be returned to the transfer station 32 to receive an image on the other side of the print medium before being delivered to one of the output trays 42, 44 of the printing apparatus. The operation of the printing apparatus, including the control of the transport of the print medium, the processing of input image information, and the transfer of that image information to the raster output scanner, as well as the control of the elements within the print cartridge, are all controlled by an electronic subsystem (ESS) 46. The electronic subsystem 46 may also include one or more machine control units or central processing units that include microprocessors and suitable memories, for storing machine operating software.

Figure 2:
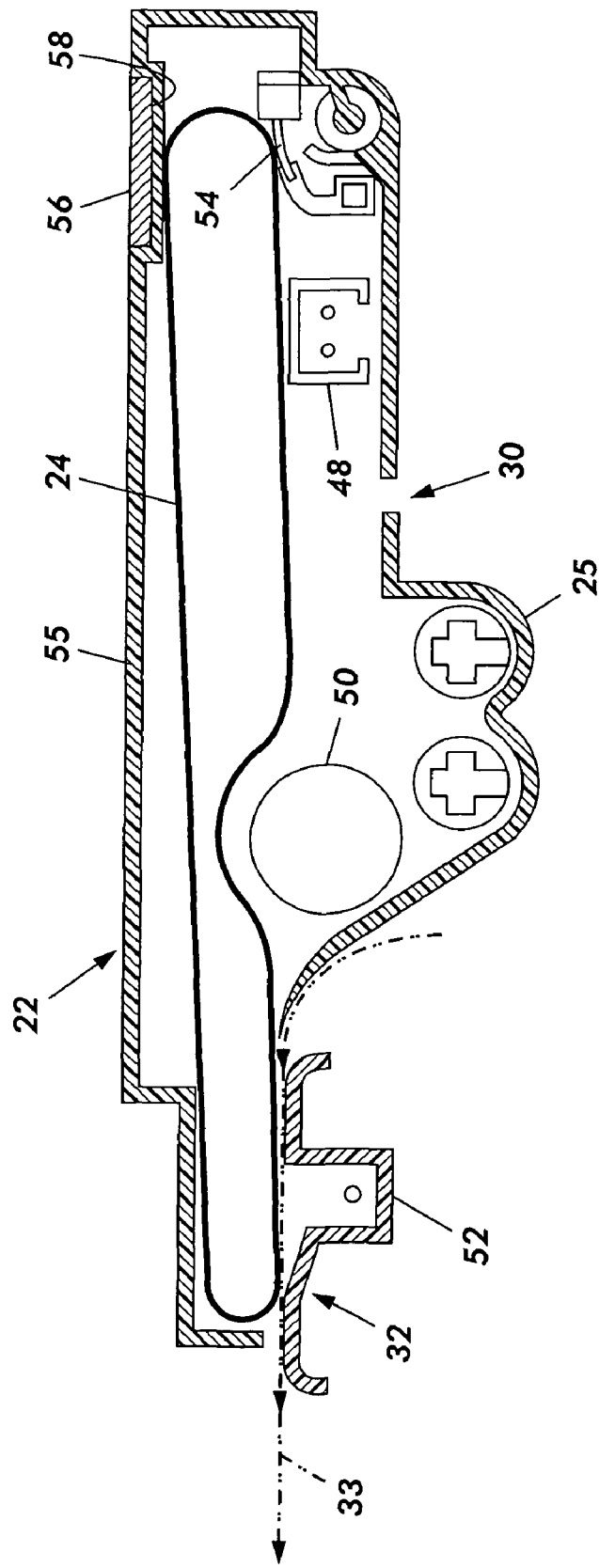
FIG. 2 is a cross-sectional view of a replaceable module for the printing apparatus of FIG. 1.
Figure 3:
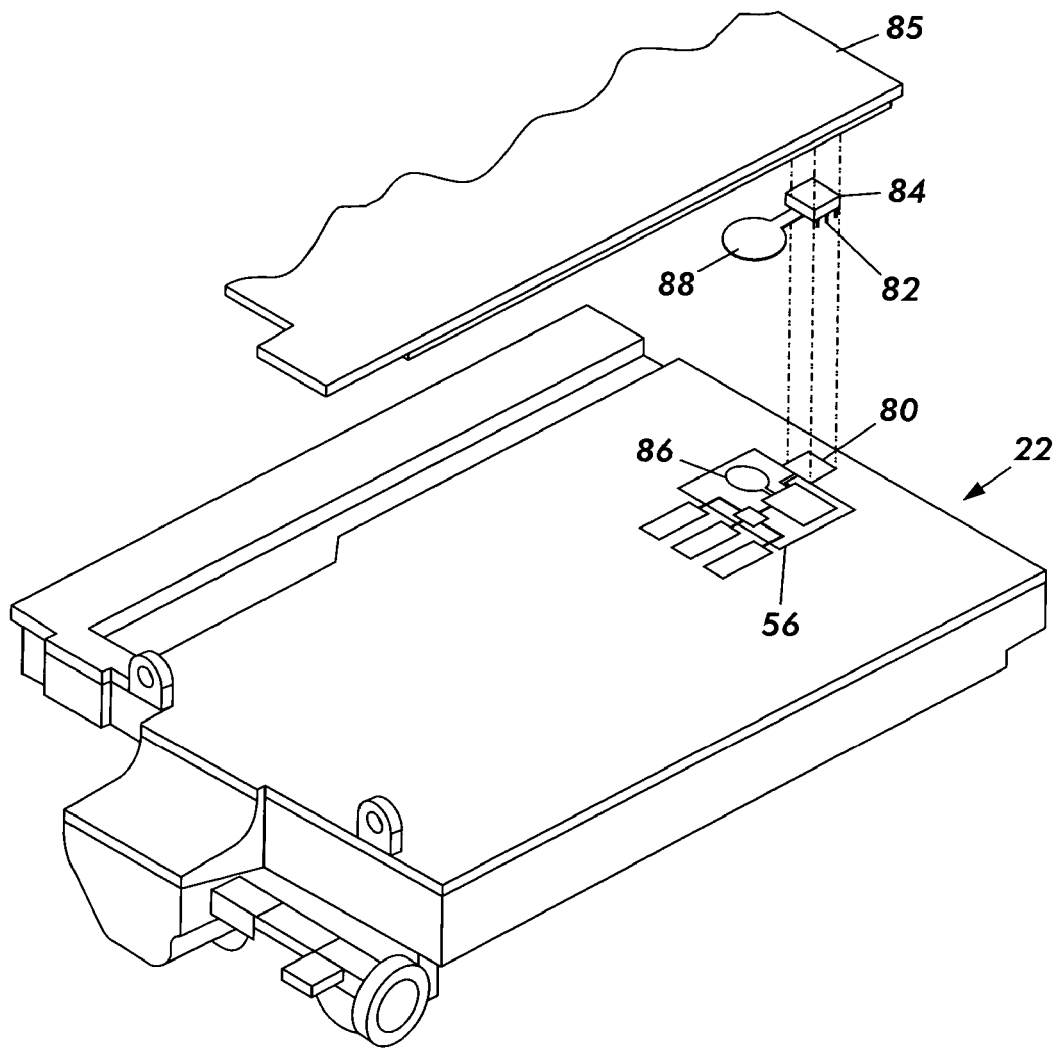
FIG. 3 is a perspective view of the replaceable module of FIG. 2.

The print cartridge module 22 shown in FIG. 2 may also include a charge scorotron 48, a developer device 50, a transfer corotron 52, a cleaning device 54, and a housing 55. The charge scorotron is located upstream of the imaging slit 30 in the cassette to apply a uniform electrostatic charge to the surface of the photoreceptor belt 24 before the photoreceptor belt is exposed to the imaging beam. The developer device 50 is located downstream of the imaging slit to bring developer mixture into proximity with, and thereby develop, the electrostatic latent image on the photoreceptor belt. The developer mixture is a component mixture comprising toner and a magnetically attractable carrier. Toner is transferred to the photoreceptor belt during image development and replacement toner is dispensed periodically from a hopper or container (not shown) into the housing of the developer device. The transfer corotron 52 is located at the transfer station 32 to assist in transferring the developed image from the belt to the print medium that enters the print cartridge at that point. Finally, a cleaning device 54 removes any residual toner particles from the surface of the photoreceptor belt. The photoreceptor belt is then illuminated by a discharge lamp to remove any electrostatic charge remaining on the photoreceptor belt.

The print cartridge 22, as has already been mentioned, may be removed from the printing apparatus, and replaced with another print cartridge. Such replacement typically takes place if any of the process elements located within the print cartridge deteriorate. The print cartridge has an on-board monitoring system 56 securely attached to the replaceable module. In a particular illustrated implementation, the on-board monitoring system is securely attached to a section 58 of the replaceable module.

Figure 4:
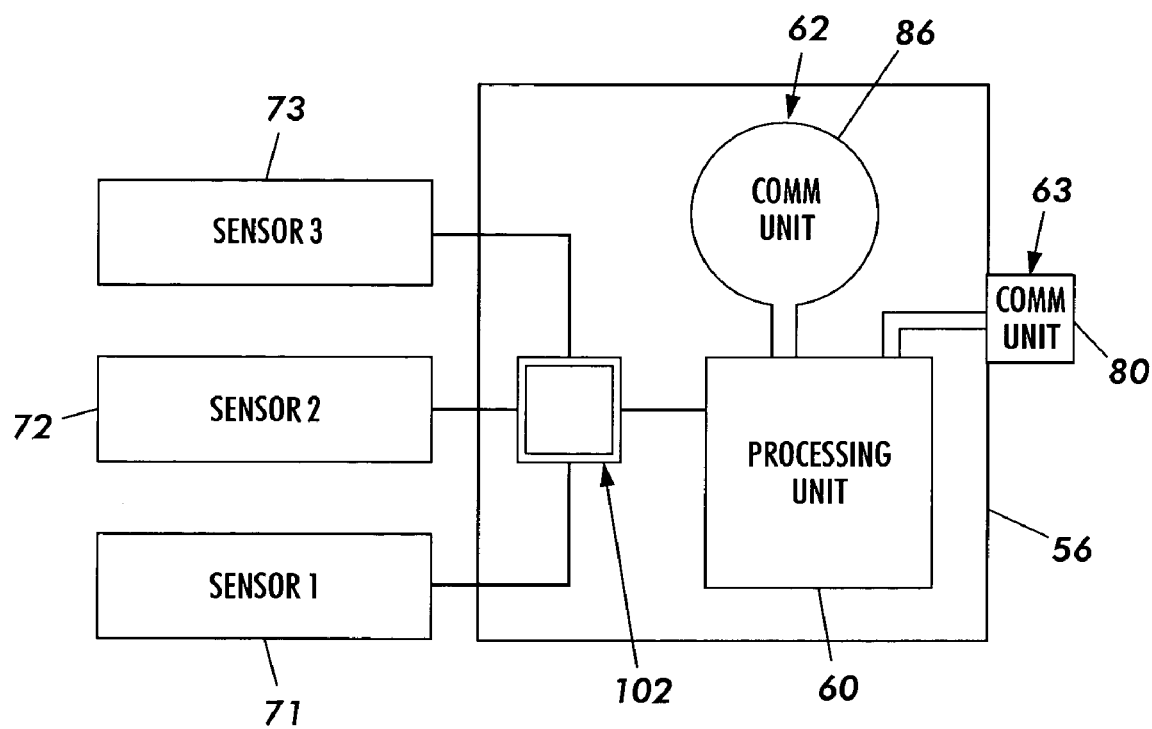
FIG. 4 is a schematic diagram of an intelligent on-board monitoring element for the replaceable module of FIG. 3.

Referring now to FIG. 4, the on-board monitoring system 56 includes a processing element 60 and one or more communication elements 62, 63 for communicating between the on-board monitoring system and another device, such as the printing apparatus.

Figure 5:
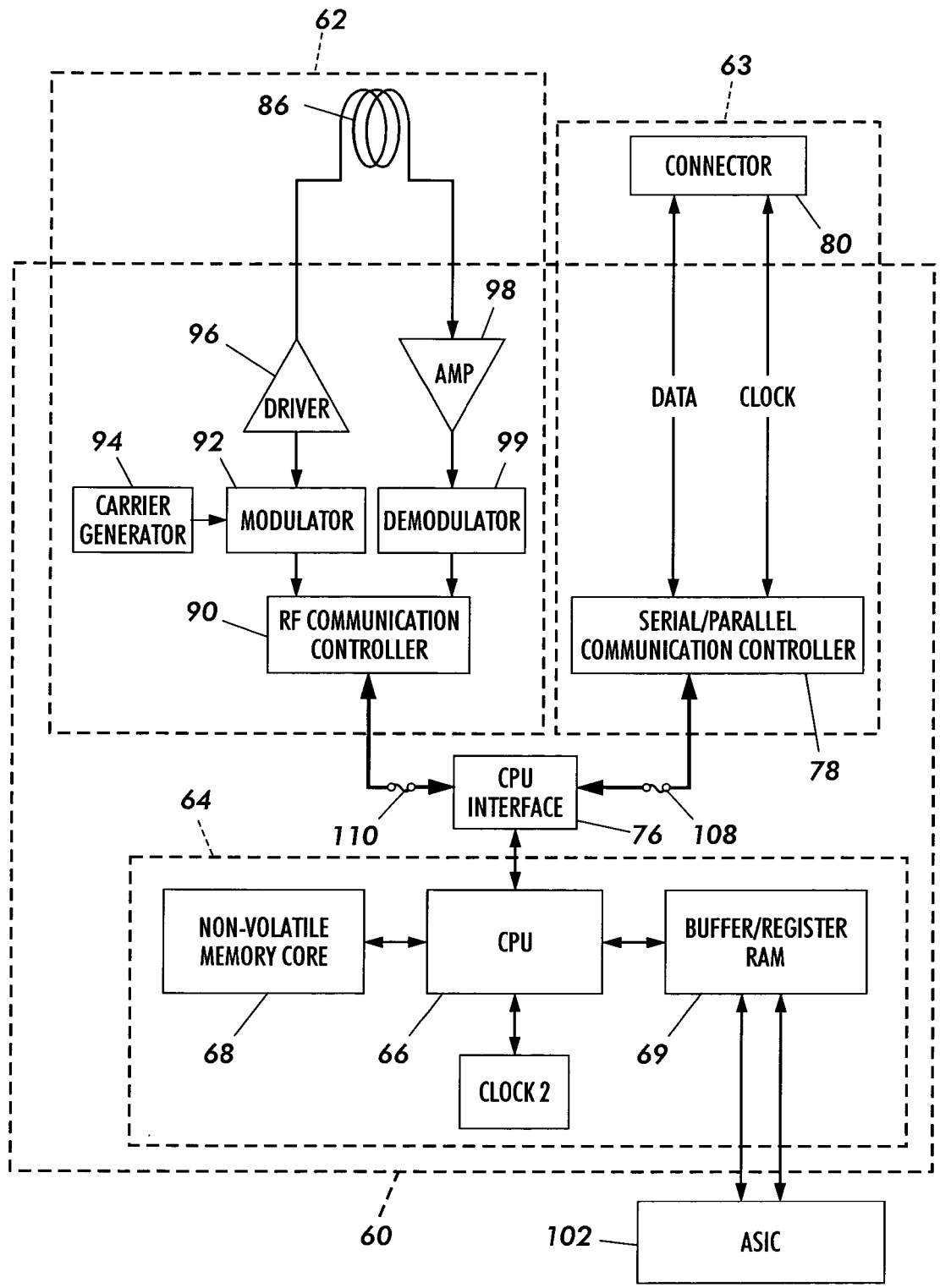
FIG. 5 is a schematic diagram of a portion of the intelligent on-board monitoring system of FIG. 4.

Referring next to FIG. 5, an exemplary processing element 60 includes a microprocessor 64 that contains a central processing unit (CPU) 66 and memory elements 68, 69. The memory elements may include a non-volatile memory core portion 68 for holding permanent information, such as operating software, device identifying information, or other such information, and information that may be changeable, but is to be retained through a power-off, power-on sequence. Examples of non-volatile memory may include flash memory, flashcards, nonvolatile integrated circuit chip memory, or bubble memory. The memory also includes a volatile memory portion, such as random access memory 69. The memory elements 68, 69 are connected to the central processing unit 66 so that the central processing unit can receive information and instructions from the memory elements. The central processing unit is also connected to the memory elements 68, 69 so that the central processing unit can write information into the memory elements.

The on-board monitoring system also includes one or more sensors 71, 72, 73, as is depicted in FIG. 4. The sensors gather or detect information pertaining to the replaceable module and/or its operating environment. For example, one sensor 71 may detect when the quantity of toner in the print cartridge falls below a particular threshold. Another sensor 72 may detect when the photoreceptor belt is worn. A third sensor 73 may sense the condition of the cleaning device. Persons skilled in the art will recognize that depending on the replaceable module to which the monitoring system is attached, different parameters and information can be gathered that may be relevant to the operation of the printing apparatus and/or the replaceable module. Because of such variations, the sensors 71, 72, 73 are shown only in schematic form.

Returning to FIG. 5, the monitoring system includes one or more communication elements 62, 63 for communicating information to and from another device, such as the printing apparatus. The particular embodiment includes both a hardwire communication element 63 and a wireless communication element 62. Portions of the communication elements 62, 63 may be part of the processing element 60, or may be separate elements. The communication elements connect to the central processing unit 66 through a CPU interface 76.

The hardwire communication element 63 includes a serial/parallel communication controller 78 that controls communication through an external connector 80. The external connector may be a pin and socket type connector of conventional construction. For example, the external connector on the monitoring system may include a plurality of sockets that interact with pins 82 extending from a printer connector 84 (see FIG. 3). The printer connector 84 is securely attached to a portion 85 of the printing apparatus so that the pins of the printing connector fit into the sockets of the replaceable module monitoring system connector when the replaceable module is properly inserted into the printing apparatus.

The replaceable module monitoring system may also include a wireless communication element 62. The wireless connector element may include a radio frequency communication elements, including an antenna 86. The wireless connector or communication element communicates over a wireless communication link provided between the antenna 86 on the replaceable module monitoring system and a comparable RF antenna 88 on the printing apparatus (see FIG. 3). In certain circumstances, it may be desirable for all information communication to take place using the wireless communication element, so that the hardwire communication element can be as simple as possible. For example, a simple two wire connection can deliver power from the printing apparatus to the replaceable module monitoring system.

The radio frequency wireless communication element includes an RF communication controller 90 that connects to the CPU 66 of the microprocessor 64 through the CPU interface 76. The RF communication controller 90 provides a signal to a modulator 92. The modulator 92 modulates the signal onto a RF carrier signal generated by a carrier generator 94. A driver 96 conveys the modulated RF signal to the antenna 86. RF signals received at the antenna 86 are amplified by an amplifier 98, and demodulated by a demodulator 99 before being passed on to the RF communication controller 90. Wireless and wireless communication elements are described in U.S. Pat. No. 6,532,351 to Richards et al. on Mar. 11, 2003, the contents of which are hereby incorporated by reference in there entirety.

An application specific integrated circuit (ASIC) 102 (also shown in FIG. 4) provides the interface between the replaceable module monitoring system sensors 71-73 and the processing element 60. As persons familiar with the art will recognize, the ASIC is specially designed to convert signals received from the sensors into digital data appropriate for processing by the microprocessor.

The microprocessor 64 of the processing element 60 receives input information from the sensors 71-73 through the ASIC, or from the printing apparatus through one of the communication elements 62, 63. In addition, the non-volatile memory 68 may contain information pertinent to the replaceable module itself. The central processing unit 66 performs arithmetic operations, or calculations upon input information data from the memory elements to produce calculated results. The central processing unit then delivers the calculated results to the volatile (random access) memory 69 and/or the non-volatile memory 68.

An on-board monitoring system for a replaceable unit for a printing apparatus can perform entirely on the replaceable module various calculations and other operations, reducing the need to communicate with the printing apparatus, and also reducing the computational requirements imposed upon the printing apparatus.

There are numerous operations and functions that can be performed using the on-board monitoring system incorporating a microprocessor. For example, the printing apparatus can supply to the monitoring system information about print operations that the print module is called upon to perform. Such information may include information that can be used to estimate the amount of usage to which the replaceable module is put. Persons skilled in the art will recognize that certain printing information can be used to estimate the remaining life of certain components within a replaceable module. For example, if the replaceable module contains a consumable material, such as toner, retaining information about the quantity of printing performed by the replaceable module can be used to estimate when the supply of the consumable material is nearly exhausted. Thus, the printing apparatus may supply to the monitoring system information about the number of pixels in the images printed, or the number of pages printed, or other relevant information. With the on-board intelligent monitoring system, the microprocessor can process the information received from the printing apparatus concerning printing operations performed, and combine that information with previously stored information pertaining to the expected life of the components in the replaceable module. The CPU 66 can calculate using that information when the expected end of life for the replaceable module, or some component thereof, is reached, or is about to be reached. Upon making such a calculation, the CPU can then communicate to the printing apparatus a status decision, such as "toner low" or other relevant decisional information. In this way, the resources of the computational processing elements within the printing apparatus are not consumed performing such calculations that relate only to the particular replaceable module. In addition, performing such calculations in the intelligent monitoring system on-board the replaceable module reduces the amount of data that must be communicated between the replaceable module and the printing apparatus.

In another mode of operation, the computational process undertaken by the CPU of the intelligent monitoring system on the replaceable module may take into account information about the status of the replaceable module as detected by the sensors. For example, if a toner level sensor detects that the toner level within the replaceable module is low, that information, delivered to the microprocessor through the ASIC can be processed by the CPU, so that a status decision ("low toner") can be communicated to the printing apparatus. Persons skilled in the art will recognize that the microprocessor of the intelligent monitoring system can perform numerous evaluations based on various combinations of permanent information stored in the non-volatile memory, print operation information received from the printing apparatus, and status information received from the sensors.

In yet another mode of operation, the intelligent monitoring system facilitates the upgrading of a replaceable module without requiring that the electronics or software of the printing apparatus be correspondingly changed. This greatly simplifies the ability to improve the performance of the replaceable modules of a printing apparatus. When new performance characteristics are built into a replaceable module, the microprocessor 64 of the intelligent monitoring system on the replaceable module 22 may be programmed to reflect those improved performance characteristics. The central processing unit of the microprocessor of the intelligent monitoring system can then perform the requisite calculations to take into account the altered performance characteristics, and deliver to the printing apparatus information that has been adjusted to take such altered performance characteristics into account. For example, if the printing apparatus is designed to receive status decision information only, the intelligent monitoring system provides to the printing apparatus the correct status decision in accordance with the altered performance characteristics. Even if the printing apparatus is designed to perform its own decision processes, the microprocessor of the intelligent monitoring system can be programmed to alter the information provided to the printing apparatus so that the printing apparatus operates correctly upon the improved replaceable module. The printing apparatus may be designed to receive module data from the replaceable module and use a particular first algorithm or procedure to determine a module status result. If the new module calls for the module status result to be determined using a different (second) algorithm or procedure, the intelligent on-board monitoring system can prepare modified module data so that the printing apparatus itself does not need to be modified to include the second algorithm. The microprocessor of the intelligent on-board monitor receives input module data, and calculates the modified module data, and communicates the modified module data to the printing apparatus. The modified module data is prepared so that, when the printing apparatus applies its first algorithm to the modified module data, the printing apparatus produces module status results as though it were using the second algorithm on the input module data.

If for example, the printing apparatus is programmed to indicate that the photoreceptor belt is worn to an unacceptable degree after a certain number of images have been applied upon it, but a new photoreceptor belt is installed that permits a greater number of images to be applied before its performance deteriorates, the intelligent monitoring system can be programmed so that it delivers to the printing apparatus information that leads the printing apparatus to believe that fewer prints have been made using the photoreceptor belt, proportioned in accordance with the improved longevity of the photoreceptor belt actually installed. In an example, if a printing apparatus is designed with a replaceable module having a life of, ten thousand prints, the programs within the printing apparatus may be set up to inform the user after such ten thousand prints that the usable life of the replaceable module is finished, and the replaceable module should be replaced. If subsequent improvements to the replaceable module provided with a useful life of, for example, twenty thousand prints, an intelligent monitoring system incorporating a microprocessor can be configured to inform the printing machine of only half the prints actually made using the replaceable module. In this way, the printing apparatus indicates the end of the useful life of the replaceable module at the conclusion of twenty thousand prints, rather than prematurely at ten thousand prints, without having to program the printing apparatus.

Figure 6:
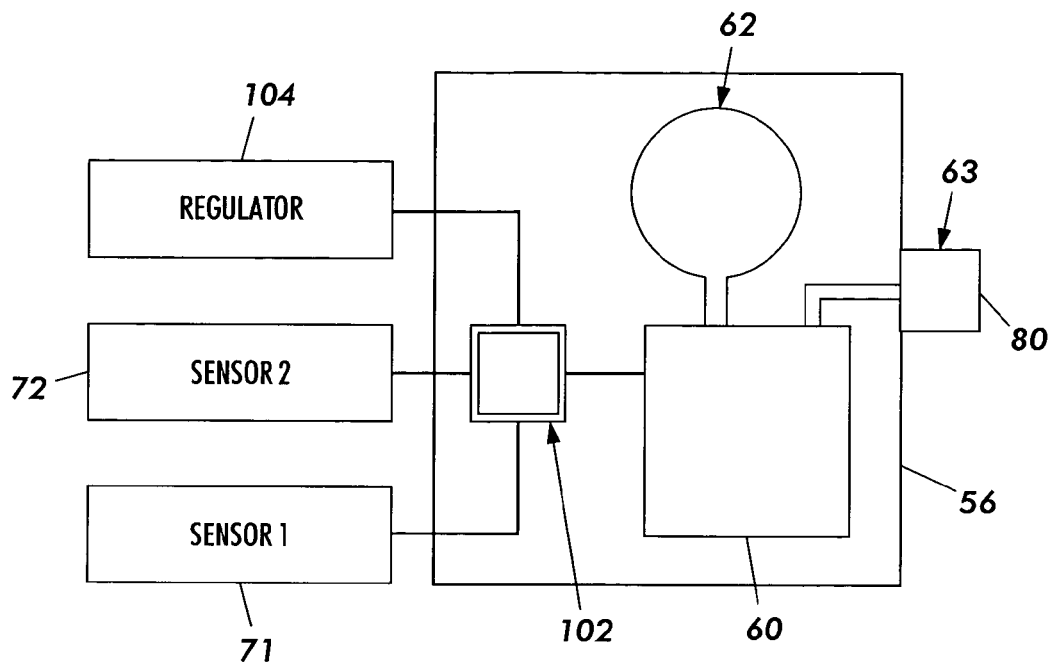
FIG. 6 is a schematic diagram of an alternative embodiment of an intelligent on-board monitoring system for a replaceable module of a printing apparatus.

FIG. 6 illustrates an implementation in which the intelligent monitoring system can also be used to control one or more operating parameters of the replaceable unit. Referring now to FIG. 6, in addition to the sensors 71, 72 for detecting status input information from the replaceable module, the system includes a regulator or controller 104 that is connected to operate one of the operating elements of the replaceable unit, such as the charge scorotron 48 or the transfer corotron 52 (shown in FIG. 2). The regulator may govern, for example, the voltage applied to the operating element, the timing of an electrical charge or signal applied, or some other factor. The microprocessor 64 of the processing core 60 provides a control signal through the ASIC 102 and the regulator 104 to control the operation of the operating element. This arrangement permits altering the performance characteristics of the operating element without requiring that new or additional control software be installed into the printing apparatus. If, upon manufacturing or refurbishing the print cartridge, the performance characteristics of, for example, the corotron, are altered such that different control signals are desired, the microprocessor 64 of the intelligent monitoring system can be reprogrammed so that the calculations performed in the central processing unit generate the appropriate signals to be delivered through the ASIC and the regulator for altering the operating parameters of the operating element.

Figure 7:
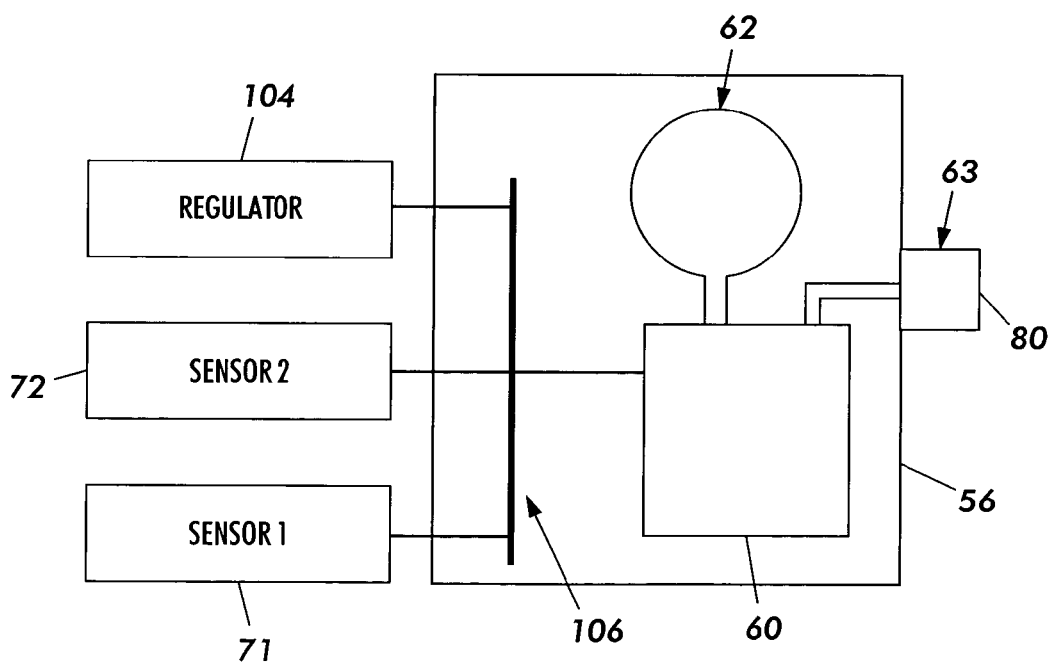
FIG. 7 is a schematic diagram of a further alternative embodiment of an intelligent on-board monitoring system for a replaceable module of a printing apparatus.

FIG. 7 shows an implementation of the intelligent on-board monitoring system that is similar to the embodiment illustrated in FIG. 6, except that the interface between the processing element 60 and the sensors 71, 72 and/or regulators 104 is a serial bus 106, rather than an ASIC. The sensors and regulators used in the embodiment illustrated in FIG. 7 include integrated signal conditioning and processing, and also a serial interface. The sensors thus properly condition and process the sensed data for transmission upon the serial bus. The regulator 104 then receives the appropriate serial information, and prepares it for use in regulating the operation of an operating element of the replaceable module.

The communication elements, and the wireless communication element in particular, can be used for communicating with devices other than the printing apparatus. As described in previously noted in U.S. Pat. No. 6,532,351 B2 to Richards et al., if the wireless communication element is such that it operates with wireless signals that can pass through the packaging in which the replaceable unit is shipped, the wireless communication and element can be used to receive data and program the processing element during warehousing and shipment of the replaceable unit. Following such programming, the wireless communication element can be disabled, leaving the wired communication element for connection to the printer, or the wireless communication element can remain operational for use with in wireless communication between the printing apparatus and the replaceable module. Fuses 108, 110 (shown in FIG. 5) connecting the wired and wireless communication elements 63, 62 to the CPU interface 76 provide an exemplary technique for permitting either communication link to be severed when that communication link is no longer needed. In an alternative, information transfer occurs through the wireless communication element 62, and the hardwire communication element transfers only electrical power. In such an arrangement, the serial/parallel communication controller 78 may be unnecessary.

Figure 8:
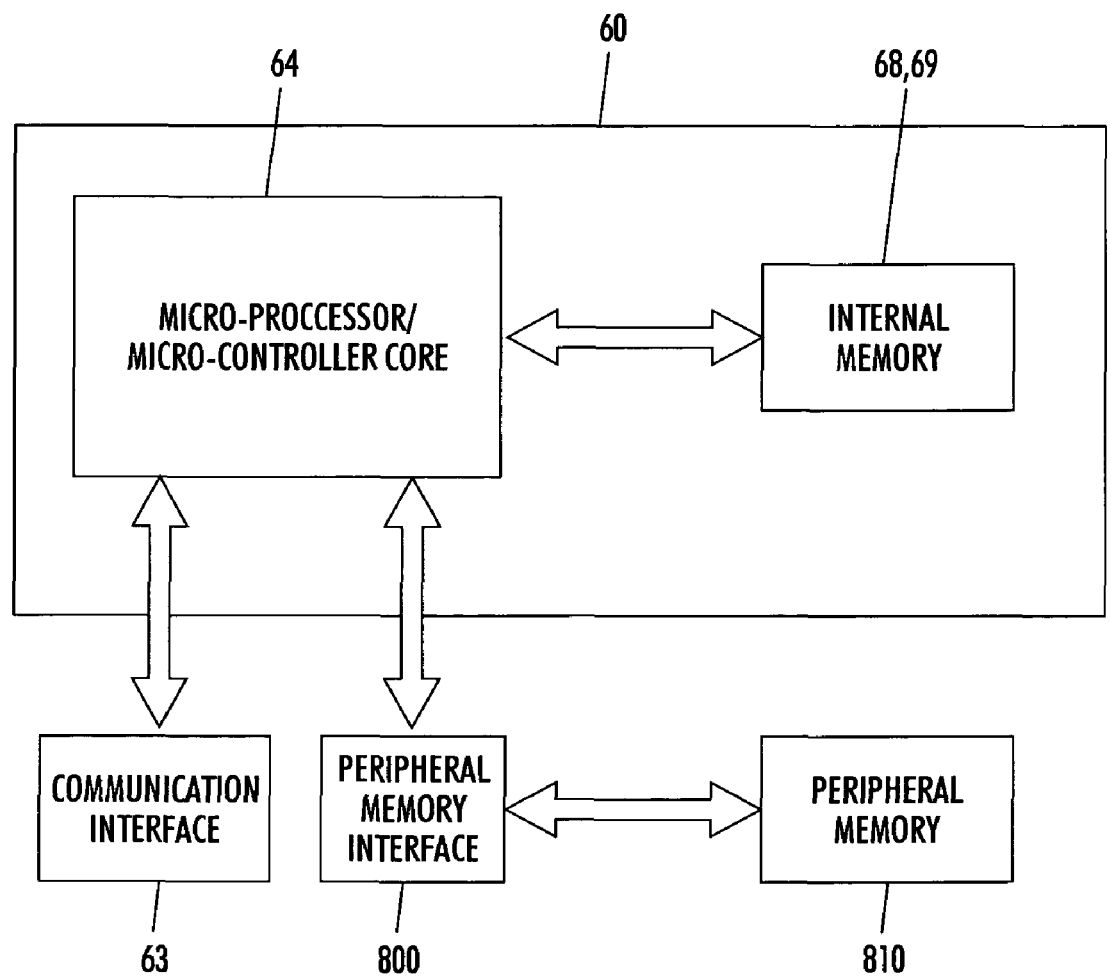
FIG. 8 is a schematic diagram of an alternative embodiment of an intelligent on-board monitoring system for a replaceable module wherein memory expansion is provided.

FIG. 8 schematically depicts an arrangement allowing the amount of storage capability available to the processing unit 60 to be expanded. Such an increase in storage capacity would be for the benefit of those desirable software upgrades for a printing apparatus with programmable software controls, where the amount of code exceeds that more normally provided. In one embodiment, the internal memory of the processing unit 60 will contain firmware while an external memory interface 800 allows the processing unit 60 to connect to larger sized memory 810 when performing machine software upgrades. In one example, this external memory 810 could consist of memory modules such as flashcards. The communications interface 63 allows the processing unit 60 to fulfill standard replaceable module behavior with the machine while also supporting other processes such as machine software upgrades. In the same fashion that all machines that use conventional replaceable modules (those absent a processor 60) in their supplies have standard interfaces (for example a 4-wire I²C bus) the communication interface for the replaceable module monitoring system 56 described herein would be standard also. As will be well understood by those skilled in the art, in at least one embodiment it is preferred that this interface 800 is sufficiently fast to support software upgrades directly from the processing unit peripheral memory 810. However, for those machines that are networked connected, the replaceable module monitoring system 56 does not need to contain the software upgrade itself but only the necessary information to control the upgrade process via a network connection. An example process flowchart in contemplation of this is shown in FIG. 9.

Figure 9:
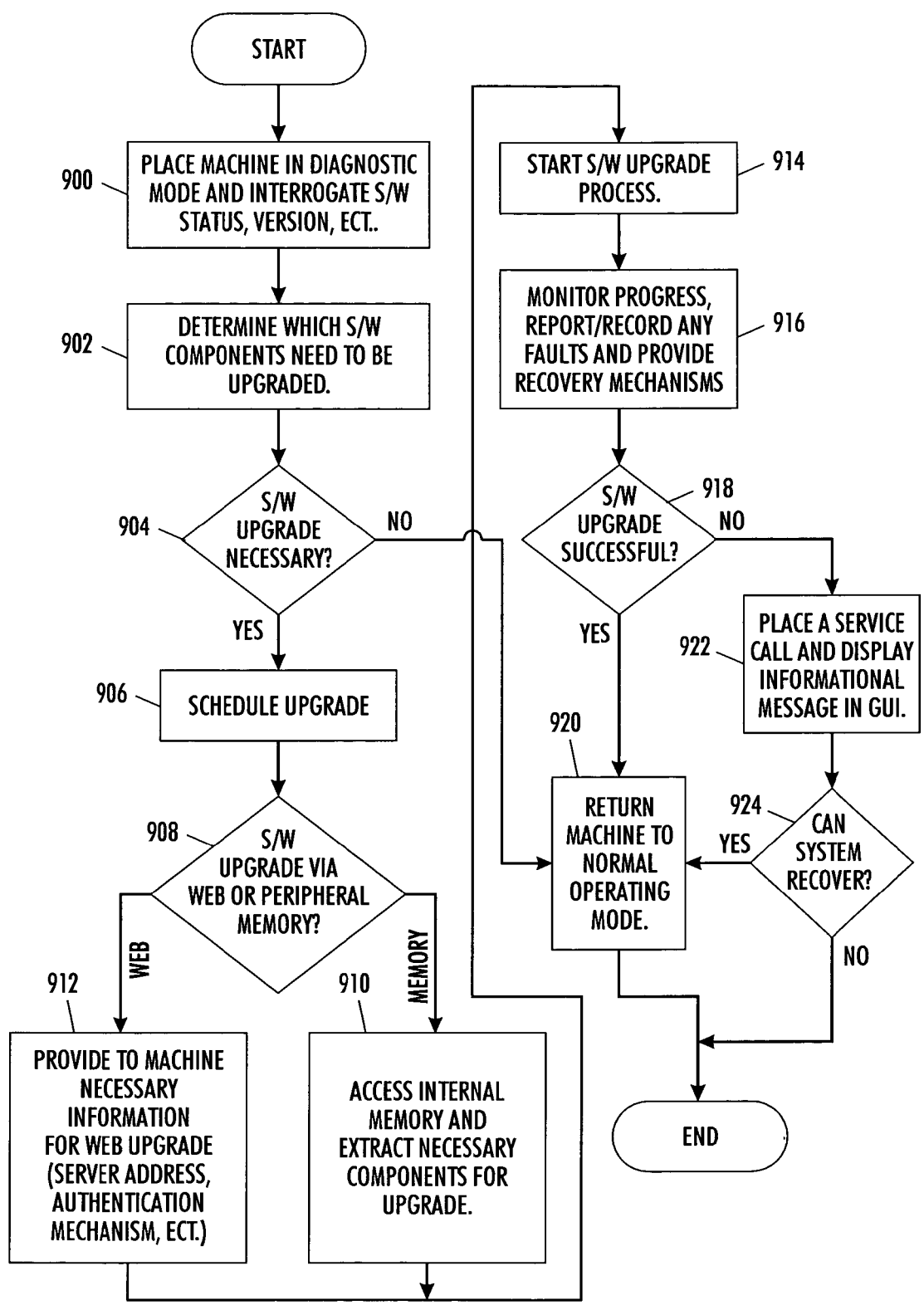
FIG. 9 is an example process flowchart for operation of the intelligent on-board monitoring system of FIG. 8.

FIG. 9 provides one approach to a methodology enabling the replaceable module monitoring system 56 to provide software upgrades to the machine in which it is installed. Upon installation the replaceable module monitoring system 56 will place the machine in diagnostic mode 900 and interrogate the machine for software status, version indicia, ext. Comparison is then made against available software upgrades 902 and as against the current machine hardware status including what other replaceable modules previously installed are resident. If determination is made 904 that no software upgrade is necessary the machine is returned to normal operating mode 920 and the process ends. However, if the determination 904 is made that a software upgrade is appropriate then the upgrade is scheduled 906. This may mean an immediate installation in real time takes place or it may mean waiting for a suitable period of machine idling to be established. In another arrangement it may mean scheduling for an after hours software upgrade install. After scheduling of the upgrade a determination 908 is made as to whether the upgraded code is to be provided via the web/network or from peripheral memory 810. If the code origin is to be via the web 912 then it is necessary to provide to the machine with all necessary information such as server address, authentication mechanism, and so on, as will be understood by those skilled in the art. In the alternative, if the determination 908 is made that the desired software code is available in internal memory, access 910 is made and any necessary software components are extracted for the upgrade.

Once the determination as to where the code is stored for the software upgrade the software upgrade process 914 may be started. Once initiated, the software upgrade is monitored 916 for progress, and a report may be recorded of any faults as well as invoking any recovery mechanisms that may be needed. This is then passed to decision block 918 for determination of if the software upgrade was successful. If the upgrade is successful the machine is returned to normal operating mode 920 and the process ends. However, if the upgrade has been unsuccessful recordation and indication step 922 is invoked. This step may include placing a service call or displaying information to the operator via a graphical user interface or other means. Determination is then made as to the ability of the machine to recover 924. If recovery is deemed possible the machine is returned to normal operating mode 920 and the process ends. If recovery is not possible the process just ends.

By providing a microprocessor enabled monitoring system 56 with expanded memory access and in addition, or in the alternative, with network access, a replaceable module so endowed may selectively keep fleet of machines out in the field properly up-to-date as to software code upgrades. This is accomplished without the need for sending a Field Engineer Representative to the customer site. By proper scheduling the need to impact customer machine access and productivity is eliminated or minimized. Further, by use of monitoring and network reporting the machine fleet condition may be gathered as to an inventory of all machines the software status of each.

Persons skilled in the art will recognize that numerous modifications and enhancements to the particular embodiments described above can be made without departing from the spirit and scope of the present invention. For example, numerous other modes of operation in which information is processed by the microprocessor of the intelligent on-board monitoring system can be devised based on the knowledge of the person of ordinary skill in the art after reading the above description of a few particular implementations. In addition, persons skilled in the art will recognize that the intelligent on-board monitoring system can be applied to a wide variety of modules of a printing apparatus, some of which may be single purpose modules, and others may incorporate multiple elements, such as the printer cartridge described in the particular embodiment above. Furthermore, although an exemplary implementation in an electrostatic printing apparatus has been described in detail, the principles of the implementation can be applied to replaceable modules of other types of printers, such as ink jet (liquid, phase change, acoustic, etc.) Therefore, the invention is not limited to the particular implementations described above.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A replaceable module for a printing apparatus with programmable software controls, the module comprising:
    an internal memory comprising a non-volatile core portion and a volatile portion for holding stored instructions;
    a peripheral memory external to said module, comprising increased storage space for holding a software upgrade for the printing apparatus programmable software controls;
    a communications interface for exchanging information with the printing apparatus; and,
    a microprocessor connected to the internal memory, the peripheral memory and the communications interface, the microprocessor performing the stored instructions to compare currently installed software and current machine status with available software upgrades, independent of whether said module has been replaced, determining that the software upgrade is appropriate for installation upon determining that the software upgrade is available, then automatically install the software upgrade into the printing apparatus via the communications interface when the replaceable module is installed in the printing apparatus by causing said printing apparatus to idle, upgrading software by extracting necessary components from a web based source or from an internal memory source, monitor progress of the upgrade, report any faults, contact service personnel when the upgrade is not successfully completed, and return the printing apparatus to normal operation when the software upgrade is complete so that the software upgrade for the printing apparatus is inhibited from being repeated.

2. The replaceable module of claim 1, wherein the communications interface comprises a wired communication element.

3. The replaceable module of claim 1, wherein the communications interface comprises a wireless communication element.

4. The replaceable module of claim 1, further comprising a peripheral memory interface, where the microprocessor is connected to the peripheral memory through the peripheral memory interface.

5. The replaceable module of claim 4, where the peripheral memory comprises flash memory.

6. The replaceable module of claim 5, where the peripheral memory comprises flashcards.

7. The replaceable module of claim 4, where the peripheral memory comprises nonvolatile integrated circuit chip memory.

8. The replaceable module of claim 4, where the peripheral memory comprises bubble memory.

9. In a printing apparatus, a method of operating a replaceable module, the method comprising:
  installing the replaceable module in the printing apparatus:
  allowing a processor element on board the replaceable module to interrogate the printing apparatus, wherein the interrogating includes identifying previously installed replaceable modules;
  determining which software components in the printing apparatus need to be upgraded, independent of whether the module has been replaced, by comparing software currently installed in the printing apparatus with available software upgrades;
  accessing external memory to retrieve and load any necessary software code components for an upgrade;
  automatically installing the software code into the printing apparatus by the processor element in the replaceable module so that a field engineer or other individual need not perform the software upgrade for the printing apparatus;
  monitoring the progress of the software upgrade;
  reporting any fault occurring during the upgrade to an apparatus operator;
  placing a service call to a field engineer if the upgrade is unsuccessful; and
  returning the printing apparatus to normal operating mode when the software upgrade is complete.

10. The method of claim 9 wherein the processor element is a microprocessor.

11. The method of claim 9 wherein the memory is accessed via a network connection.

12. The method of claim 11 wherein the network connection is comprised of the Internet.

13. The method of claim 11 wherein the network connection access is accomplished by a wireless communication element.

14. In a printing apparatus, a method of operating a replaceable module having a processor element on board the replaceable module, the method comprising:
  installing the replaceable module in the printing apparatus:
  placing the printing apparatus into diagnostic mode;
  allowing a processor element on board the replaceable module to interrogate the printing apparatus;
  interrogating said printing apparatus by comparing currently installed software and current machine status with available software upgrades, independent of whether the replaceable module has been replaced;
  determining from the interrogation which software components in the printing apparatus need to be upgraded;
  automatically scheduling as determined by the processor element when a software upgrade should occur;
  accessing external memory as directed by the processor element in order to retrieve and load necessary software code components to perform an upgrade;
  installing the software code into the printing apparatus by the processor element in the replaceable module;
  monitoring the progress of the software upgrade;
  reporting any fault occurring during the upgrade to an apparatus operator;
  placing a service call to a field engineer if the upgrade is unsuccessful; and
  returning the printing apparatus to normal operating mode when the software upgrade is complete.

15. The method of claim 14 wherein the processor element is a microprocessor.

16. The method of claim 14 wherein the memory is accessed via a network connection.

17. The method of claim 14 wherein the memory is comprised of flashcards.

18. The method of claim 16 wherein the network connection access is accomplished by a wireless communication element.

19. The method of claim 14 wherein the interrogation further comprises gathering machine and software version indicia, model number, serial number, and other identifying information, as would be desirable for completing an inventory of machines in the field.

20. The method of claim 19 wherein the identifying information is passed via the network connection.

21. The method of claim 19 wherein the identifying information is stored in memory on the replaceable module.

* * * * *